Sept. 9, 1930.    R. A. STEPS ET AL    1,775,376
CEMENT EQUALIZER
Filed July 8, 1929
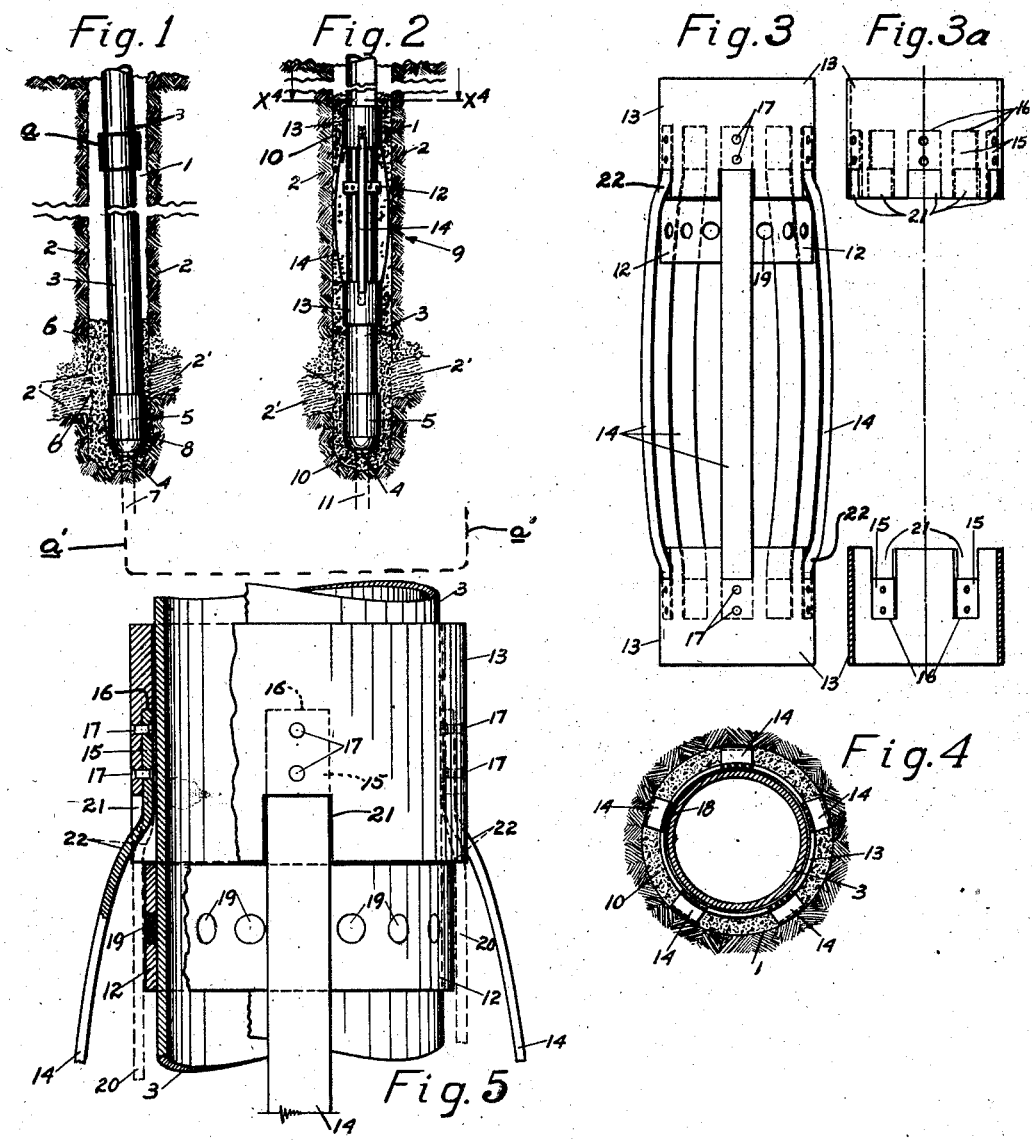
William Walter Hartman and Robert Alexander Steps
INVENTORS.
BY
Robert A. Steps
ATTORNEY.

Patented Sept. 9, 1930

1,775,376

UNITED STATES PATENT OFFICE

ROBERT ALEXANDER STEPS AND WILLIAM WALTER HARTMAN, OF LOS ANGELES, CALIFORNIA

CEMENT EQUALIZER

Application filed July 8, 1929. Serial No. 376,844.

This invention relates to a cement equalizer used in oil wells, and is located at such places along the well where it is desired to cement off a water bearing formation.

One of the objects of this invention is to centralize the well casing with reference to the hole, so that the thickness of cement will be approximately equal all around the pipe to prevent the water from breaking through any exceptionally thin or fragile portion of the cement seal. In the absence of an equalizer the cement seal is apt to be thin at one side, and if the water breaks through there, as is likely, this may ruin an otherwise valuable well by allowing the water to leak down past the cement seal to contaminate the oil deposits located below the water deposits.

The accompanying drawings illustrate the invention.

Fig. 1 is a diagrammatic view showing a typical cement job when no equalizer is used.

Fig. 2 is a diagrammatic view showing a typical cement job when an equalizer is used.

Fig. 3 is a front view showing the equalizer equipment without the pipe.

Fig. 3ª is similar to Fig. 3, the springs and stop collar having however been omitted, and one of the end members being in section.

Fig. 4 is a plan section on an enlarged scale through line $X^4$—$X^4$, of Fig. 2.

Fig. 5 is a front view, partly in section, through a portion of the apparatus considerably enlarged.

Fig. 1 illustrates hole 1 presumably drilled deep into the earth 2, until the water bearing strata 2' has been encountered. It is desirable to cement off this water strata before drilling further for the oil strata below, as otherwise the water might flow down into the oil and spoil the latter. In making such cement jobs the usual practice is to pour cement down through the pipe or casing 3, and to then force it out through hole 4 in the bottom of shoe 5 so as to cause it to rise around the bottom of the pipe and fill hole 1 to a point above the water bearing strata, thereby forming a cement seal 6. The object of this seal is to shut off the water in the water strata, so that when the drilling is continued along dotted line 7, the new hole will be through the cement seal without possibility of water contamination into the strata below. Since the distance from the surface of the earth to shoe 5 is usually several hundred, or perhaps several thousand feet, it is natural that shoe 5 will only rarely hang central in the hole, and that it will usually hang to one side as indicated in Fig. 1. On this account the cement seal will be very thin on this side as indicated at 8, Fig. 1, and the danger of water breaking through there, and traveling down hole 7, is considerable.

Fig. 2 on the other hand, illustrates the kind of cement job procured when our equalizer is used. This equalizer arrangement is indicated generally at 9, and its purpose is to guide or centralize pipe 3 and shoe 5 with reference to hole 1, so that when the cement is poured it will give a perfect seal as indicated at 10, Fig. 2. It will be noticed that this seal is of uniform substantial thickness all around the shoe and pipe, with no thin or fragile portion through which the water is apt to break and enter hole 11 when the latter is drilled below shoe 5. Often the equalizer is buried in the cement seal 10, but in Fig. 2 the cement has been partly omitted around the equalizer in order to more clearly illustrate the latter.

Essentially the equalizer consists of pipe 3, spacing collar 12 fastened to the pipe, and members 13 of cylindrical shape slidably mounted on the pipe, and springs 14 the ends of which are fastened to the end members 13 forming a unitary cage or structure.

Amongst other features, our invention includes an improved mode of fastening these springs 14 to the end members 13.

It will be understood that the equalizer arrangement must be very safely constructed to prevent the springs from being torn off and dropped to the bottom of the hole. If the latter happened an expensive fishing job would result because stray springs must be removed from the hole before further drilling could proceed. If not removed the spring would intercept the drill bit, and by constantly dulling the cutting edge, would impede progress of the drill. Consequently the mode of attaching these springs to end members 13 is of much importance, and should be done in the securest practical manner that would also give minimum total thickness of the parts, as hereinafter referred to. If possible the arrangement should be such that the springs are practically locked against falling out even if the attaching rivets fail to hold. Unless such high degree of security is obtained, the well drillers will refrain from using the equalizer in spite of its benefits.

In this connection it will be noticed, from Figs. 3 and 5, that we attach springs 14 to the inner surface of the cylindrical end members 13. This alone is of considerable importance as compared with fastening the springs to the outside of the end members. In addition however, our end members are formed with grooves 15 on their inner surfaces, see Fig. 3ª, and the ends of our springs 14 are made to fit nicely into these grooves, the extremities of the springs butting against the shoulders 16 at the ends of the grooves. Each spring is fastened into the groove by rivets 17. To assist in making a nice fit, the ends of the springs can be curved to suit the inner contour of the end member 13, as indicated at 18, Fig. 4.

With the foregoing arrangement it will be seen that when the pipe is inserted through the end members, the parts are then more or less knitted together so that the springs 14 could not fall out even if the rivets 17 were removed from half of the springs. This is because the remaining springs would hold the end members 13 in proper spaced relation with regard to each other, and under this circumstance the loose springs would remain in place because their ends are virtually locked in the cavity formed between the grooves and the pipe, and would stay there even if the rivets fell out. This security is necessary to justify the use of these equalizers in order to obtain the improved cement job without risking the possibility of expensive fishing jobs. There is another advantage in the arrangement just described. By locating the springs in grooves which are indented into the inner surface of the end members, the total combined radial thickness of the arrangement is kept down to a minimum, even though the parts are substantially constructed. This minimum thickness of the construction is very important because in deep holes radial clearances and distances is at a premium. Even a slight increase in hole diameter means multiplied expense, and consequently maximum radial compactness is as essential in these equalizers as the other features referred to. It might be said in a general way that this compactness should be sufficient to permit the equalizer to pass up or down through any opening however restricted, through which the usual pipe collars can pass. These pipe collars are the well known conventional members which join successive sections of pipe together. One of them is illustrated at $a$ in Fig. 1, and its size in relation to the equalizer parts is diagrammatically indicated at $a'$, in Fig. 5. These various requirements for compactness, security, etc., are all fully met by our invention.

When fully assembled on the pipe, stop collar 12 is fastened to the pipe between end members 13, the outside diameter of the stop collar being such that end members 13 can slide along the pipe up to but not beyond the stop collar. This ability of the stop collar to butt against and arrest the movement of end members 13 is best illustrated in Figs. 2 and 5. Any method of fastening collar 12 to the pipe can be used, but I prefer to weld these members together, the welding being applied in holes 19 in collar 12. In lowering the equalizer arrangement into the hole it often meets obstructions or restricted portions of the hole, in which case the springs collapse toward the pipe so as to pass the obstruction, and then expand again after the obstruction is passed. A similar collapsing of the springs occurs when the equalizer is shoved down through a long string of pipe to expand to full size after it gets into the hole below the larger pipe through which it passed. In all these cases the drag of the hole, or of the larger pipe, against the equalizer springs is such that when the equalizer is traveling downward, stop collar 12 will butt against the lower of the two end members 13, and the springs will be pulled downward by the lower end member 13. On the other hand, if the equalizer arrangement is being raised through the hole, or larger pipe, as often occurs, the drag against the springs will cause stop collar 12 to butt against the upper of the two end members 13, and the springs will thereafter be pulled upward by the upper end member 13. In other words, whether the equalizer is moved upward or downward the springs will always be pulled ahead by one or the other of the end members which causes the springs to fold in nicely when passing an obstruction or restriction, and excessive buckling and destruction of the springs is avoided as would occur if the springs were pushed forward instead of pulled forward.

As previously indicated, these equalizers must sometimes pass through very tight places, and for that reason it is desirable that the springs should collapse as flat as possible against stop collar 12, even when latter is butting square against one of the end members 13, as this insures minimum radial thickness to which reference was previously made. This fully collapsed position of the springs, is illustrated by dotted line at 20, Fig. 5. In order to bring about this relation of the parts, it is seen, first, that the outside diameter of stop collar 12 is less than the outside diameter of end member 13, and, second, that the end members 13 are provided with notches 21 along their edges, as best illustrated in Figs. 3ª and 5, these notches being in alignment with the spring grooves 15. These notches are of ample width to permit springs 14 to pass freely through them, and their purpose is to permit the springs to escape from inside the end members 13 to outside the stop collar 12, even when these two members are butting square against each other, as shown in Fig. 5. Various arrangements can be used for this purpose, but they all come within the spirit of our invention. We also prefer to slightly kink the springs as at 22 so as to permit the greatest flattening of the springs against stop collar 12 when extremely tight places in the hole are to be passed.

Since the outside diameter of end member 13 is no larger than the outside diameter of pipe collar a, and since the combined thickness of spring 14 and stop collar 12, when flattened on each other as in Fig. 5, is no larger than end member 13, it follows that our equalizer can pass through any restricted opening through which the conventional pipe collar a could pass, and consequently the addition of our equalizer to the well string creates no difficulty during sinking or raising, which would not have been encountered anyway because of the conventional pipe collars only.

From the foregoing description it is believed that the construction and operation of our equalizer will be apparent.

Some of our above described features can be used separately and independently of the others, but such separate use remains within the scope of this invention. Also we do not limit ourselves to the precise form and shape of the parts, except as specifically set forth in the appended claims.

We claim:

1. A cement equalizer comprising two cylindrical end members having grooves formed in their inner surfaces, springs the ends of which fit into said grooves and are fastened to said end members on the inside of the latter, and a stop member located between said end members and adapted to butt against said end members to limit the movement of the latter.

2. A cement equalizer comprising two cylindrical end members having notches formed in their adjacent edges and having grooves on their inner surfaces, springs which pass through said notches and have their ends located in said grooves and fastened to said end members on the inner surface of the latter, and a stop member located between said end members and adapted to butt against said end members to limit the movement of the latter.

3. A cement equalizer including a piece of pipe, a stop member fastened to said pipe, two cylindrical end members slidable on said pipe one on each side of said stop member, and springs passing over said stop member and having their ends fastened to the inner surface of said end members.

4. A cement equalizer comprising a piece of pipe, a stop collar fastened to the outside of said pipe, two cylindrical end members slidable on said pipe one on each side of said stop collar, the adjacent edges of said end members being notched, and said end members having grooves on their inner surfaces, and springs passing over said stop collar and through said notches in the end members, the ends of said springs being located in said grooves in the end members and being fastened to the end members on the inside of the latter.

5. A cement equalizer comprising two cylindrical end members, a stop collar located between said end members, and springs passing over said stop collar and having their ends fastened to the inner surface of said end members, the said stop collar and end members being formed to permit the spring to pass from the inside surface of the end members to the outside of and over the stop collar while the stop collar is butting against said end member.

6. A cement equalizer comprising two cylindrical end members having grooves in their inner surface, a stop member between said end members, and springs passing over said stop member and having their ends located in said grooves and fastened to the inner surface of said end members, and projections located between said springs and adapted to permit a butting engagement between said stop member and said end members.

In testimony whereof, we have hereunto set our hands.

ROBERT ALEXANDER STEPS.
WILLIAM WALTER HARTMAN.